Figure 1:
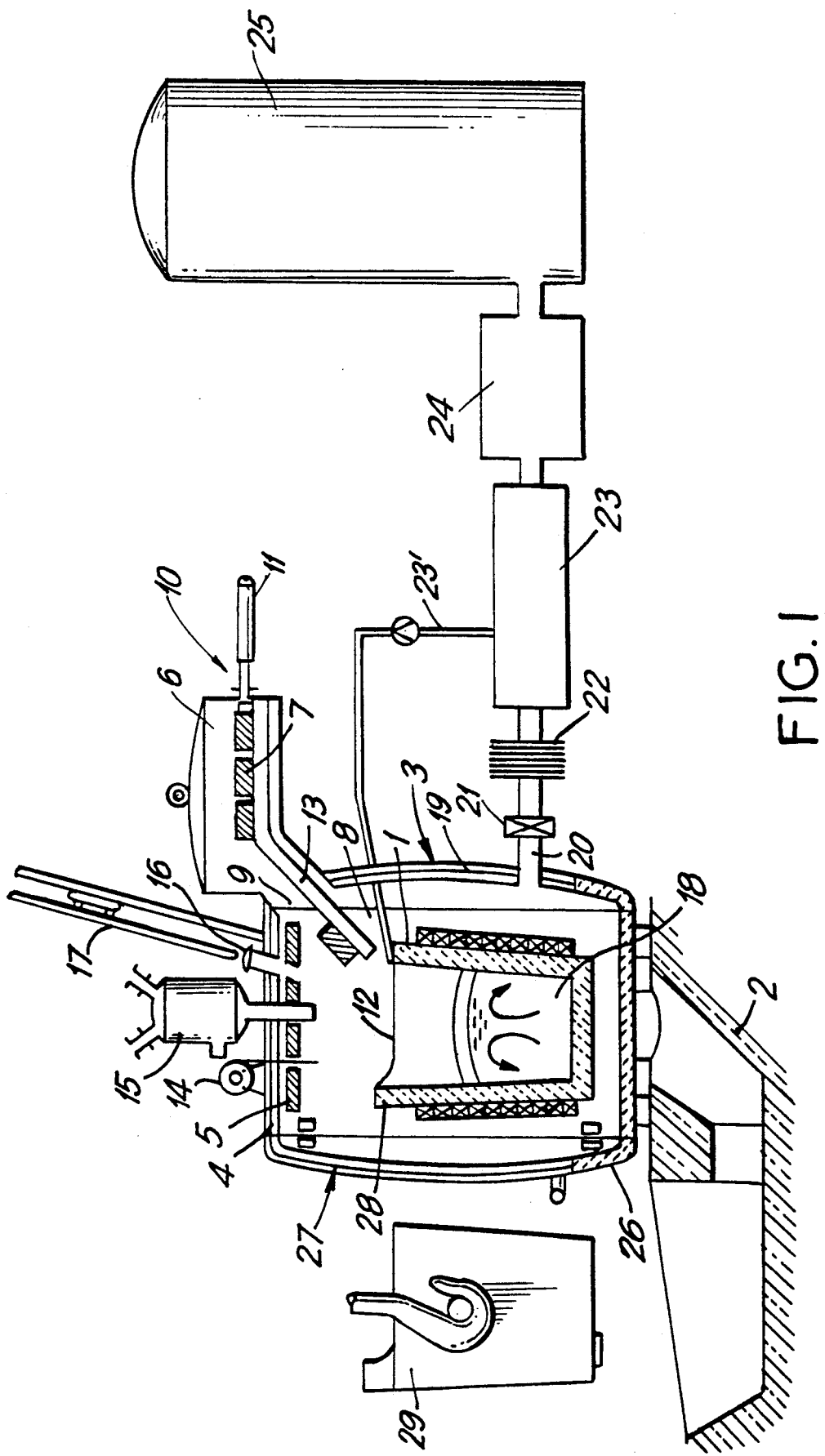

United States Patent [19]

Steins et al.

[11] Patent Number: 5,304,230
[45] Date of Patent: Apr. 19, 1994

[54] METHOD OF DISPOSING OF ORGANIC AND INORGANIC SUBSTANCES AND A PLANT FOR CARRYING OUT THE METHOD

[75] Inventors: Johannes Steins, Gallneukirchen; Harald Berger, Linz; Otto Köller, Leoben, all of Austria

[73] Assignee: Voest-Alpine Industrieanlagenbau GmbH, Linz, Austria

[21] Appl. No.: 964,501

[22] Filed: Oct. 21, 1992

[30] Foreign Application Priority Data

Oct. 24, 1991 [AT] Austria .................. 2123/91

[51] Int. Cl.$^5$ .................. C01B 13/11
[52] U.S. Cl. .................. 75/403; 75/10.14; 373/140
[58] Field of Search .................. 75/401–403, 75/10.14; 373/140

[56] References Cited

U.S. PATENT DOCUMENTS 3,448,509  6/1969  O'Reilly .................. 75/403

FOREIGN PATENT DOCUMENTS 0208881  1/1987  European Pat. Off. .
3337657  4/1985  Fed. Rep. of Germany .

Primary Examiner—Peter D. Rosenberg
Attorney, Agent, or Firm—Hopgood, Caliamfde, Kalil, Blaustein & Judlowe

[57] ABSTRACT

In a method of disposing of organic and inorganic substances, the substances are gasified and decomposed in and/or above a liquid bath of a metal alloy under negative pressure, off-gases forming are seized, collected and purified and separated.

To prevent the formation of health-endangering emissions, such as dioxins and furans, and to recover pure starting materials for the production of organic substances, the substances are charged under negative pressure into an induction furnace containing a melt (18) of an iron alloy, in particular a steel melt, and are decomposed in the latter at liquid steel temperature, whereby the entry of gaseous $O_2$ is avoided.

This is also the case at the production of steel from scrap interspersed with organic substances.

To recover pure starting materials from inorganic dusts, the latter are charged into a negative pressure induction furnace containing an iron melt together with suitable additives and are decomposed in that furnace at liquid steel temperature and are transferred to the starting materials.

23 Claims, 2 Drawing Sheets

METHOD OF DISPOSING OF ORGANIC AND INORGANIC SUBSTANCES AND A PLANT FOR CARRYING OUT THE METHOD

The invention relates to a method of disposing of organic and inorganic substances by pyrolysis, wherein the off-gases forming are seized, collected, purified and separated, in particular a method of producing steel or steel pre-products from scrap contaminated with organic substances, as well as to an arrangement for carrying out this method.

Furthermore, the invention relates to a method of re-using organic and inorganic substances as well as mixtures thereof by melting the metallic components and simultaneously pyrolysing the organic matter, wherein all the solid, liquid or gaseous reaction materials forming are seized, collected, purified, treated and used for the reutilization of raw materials, in particular for the recycling of steel and non-ferrous metal scraps with organic matter as well as of composite materials and even of organic matter alone, as well as an arrangement for carrying out this method.

Measurements of the off-gases of metallurgical melting processes have shown that when heating up and melting types of scrap contaminated with organic components (synthetic materials, lacquers, coatings etc.) under the given chemical and physical procedural conditions, in particular in the off-gas line, the formation of partially toxic polychlorinated dibenzodioxins and furans (PCDDs and PCDFs) cannot be prevented with sufficient certainty. By future decrees the authorities will limit the emission of PCDD and PCDF to a toxicity equivalent of $TE=0.1$ ng/$Nm^3$ according to its toxicologic equivalent. For storing solid industrial wastes, a $TE \leq 1.0$ ng/g is going to be prescribed in the future.

Carbon is an important element in the steel scrap melting technique, in particular during refining. Above all, it is important as a cheap source of heat in the oxidizing melting process. Its heat is usable in the conversion of C to CO, yet it is only partially usable in the complete combustion of $CO_2$ required. This is the cause for the considerable amounts of $CO_2$ emitted in the off-gas of known scrap melting processes which use carbon or fissile energy as the heat transfer media. As is known from a great number of ecologic publications, $CO_2$ substantially contributes to the increase of the greenhouse effect of the earth's atmosphere. The reduction of $CO_2$ emissions combined with an optimized use of energy in metal melting processes is an important field in the course of progressing industrialization.

This situation of emissions formed in the melting of scrap as described could have the consequence that the use of types of scrap having organic admixtures (such as, e.g., automobile or household scrap as well as composite materials) in conventional scrap melting furnaces in the future would have to be extremely reduced for economic or ecologic reasons. On the other hand, the ecologically beneficial recycling of used goods is an economic and environmental imperative. The recovery of gases and liquids incurred in the processing of scrap admixed with organic substances from which new organic substances could be reproduced, would be the optimum.

It has been known that the formation of dioxins and furans in process gases is determined and aided by the following factors:
- formation of aromates,
- presence of chlorides,
- presence of gaseous oxygen
- relatively slow and inhomogeneous passing of the temperature range of from approximately 200° to 600° C. during heating and cooling,
- catalytic effect of metal chlorides or steam.

Furthermore, dioxins and furans adsorb preferably to the dust particles of the off-gas, i.e. an increased dust incurrence by improved filtering causes additional problems due to the dioxin-absorptions on the dust. This requires a longer thermal treatment of the dust during which decomposition of the dioxins and furans occurs.

The filtration and separation of PCDD and PCDF require technically complex and expensive off-gas cooling and purification plants to be followed by an activated carbon filter, e.g. in waste combustion plants. Upon having been modified according to the specific process and plant, similar methods of treating process gas may follow scrap melting plants. Because of the large amounts of off-gas incurred mostly discontinuously in the melting process and the above-indicated frequently high $CO_2$ contents and the high dust loading of the off-gases in conventional melting techniques, it is likely that a future application of such off-gas treatment technique will be technically problematic or economically unfeasible.

On the other hand, during the combustion processes and at the production of steel, inorganic, mostly oxidic, dusts are formed, e.g., Zn oxide from the zinc coatings of steel sheets, the disposal of which causes increasing problems.

The invention has as its object to provide a method of the initially defined kind as well as an arrangement for carrying out this method which guarantee a substantial reduction of the $CO_2$ emissions as well as an observance or falling below the emission limiting values set by the authorities, while at the same time safeguarding the incurring of the lowest amounts of off-gas possible with as low a forming potential for dioxins and furans as possible. Furthermore, a simple recovery of inorganic substances and of substances that may be used for producing organic and inorganic substances is to be possible.

According to the invention, this object is achieved in that the substances are charged under negative pressure into an induction furnace containing a molten or solid metal alloy, in particular a steel or non-ferrous metal melt or highly carbureted iron, and are degassed in the same close to the liquid metal temperature and pyrolized, wherein the introduction of gaseous $O^2$ is prevented.

Charging and melting the substances containing these materials at metal liquefication temperatures of more than 700° C. and under negative pressure result in the following advantages:
- low amounts of off-gas,
- complete seizure of off-gasses,
- prevention of introduction of gaseous $O_2$ by sufficient negative pressure,
- the lowest dust content, no $CO_2$ and $NO_x$ in the off-gas,
- extensive avoidance of chlorinated and non-chlorinated aromatic compounds of the types PCDD and PCDF by the absence of gaseous $O_2$,
- recovery of raw materials for the renewed production of the organic and inorganic substances from the liquid metal and the gaseous phase.

A particularly good energy yield prevails if the melt in the induction furnace is kept bright, that is, substantially free of a slag cover.

It may be advantageous to cover the melt in the induction furnace with slag.

To produce metal or metal pre-products from metal scrap contaminated with organic substances, in particular from automobile scrap, according to a preferred embodiment of the method, the metal scrap is charged into the induction furnace under negative pressure and is melted in the latter under negative pressure.

Advantageously, less than three quarters of the melt forming in the induction furnace is tapped, and scrap, organic or inorganic substances and/or mixtures thereof are charged into the liquid or solidified residual melt remaining in the induction furnace.

Suitably, the substances forming when purifying and separating the off-gases that form at pyrolysis are collected and fed to re-utilization, and the liquefiable components thereof, in particular heavy hydrocarbons, are frozen out in cooling traps and reused as raw materials, the remaining process gas consisting essentially of $H_2$, CO, and $CH_4$ being usable as a high-quality raw material for the production of organic substances or as a heating or reaction gas.

Due to the high pyrolysis temperatures, accompanying substances present in the steel scrap, such as zinc, lead, and the like, are incurred as metals in the method according to the invention, so that they can be reused immediately upon separation.

An arrangement for carrying out the method comprising a metallurgical vessel that is sealed relative to the external atmosphere, a charging means sealed relative to the external atmosphere and an off-gas suction device is characterized in that the metallurgical vessel is designed as an induction furnace surrounded by a gas-tight container or having a vacuum lid put thereon, in which a charging means comprising a sluice system is integrated, that the container is connected to a vacuum pump producing a negative pressure and preceded by a gas purification device, the vacuum pump serving to produce a negative pressure and to suck off the off-gases incurred during melting of the scrap, and that the container is provided with a closable tap hole.

Tapping is particularly simple, if the induction furnace is tiltable within the container and in the tilted position passes the tap hole provided in a side wall by its pouring spout, or if the furnace is provided with a gas-tight lid which is moved or pivoted away during tapping.

To completely prevent off-gases from emerging even during tapping, suitably a further container is provided beside the first container so as to receive the tapping ladle, the tap hole being provided in a removable partition wall provided between the two containers and the container receiving the tapping ladle also being connected to a vacuum pump.

Advantageously, a heat shield is provided on the ceiling of the container receiving the induction furnace.

To enable a metallurgical treatment of the melt without emergence of off-gases, suitably feeding means for introducing solid operating materials and alloying media into the induction furnace designed as a crucible suitably are provided on the ceiling of the container receiving the induction furnace or on the lid of the induction furnace.

Advantageously, the ceiling of the container receiving the induction furnace comprises a closable opening for introducing and removing a sampling and/or measuring probe lance.

To enable a separation of harmful substances possibly still present in the off-gases, the gas purification device comprises a solid matter separator as well as a further separator provided for gaseous liquefiable process materials arranged to follow the solid matter separator.

Preferably, the liquefiable process substances can be returned to the melt by a returning device. This return leads to a further pyrolysis of the liquefiable process substances, and further process gas forms.

Advantageously, a gas tank for collecting and storing the process gases is arranged to follow the gas purification device.

The invention will now be explained in more detail by way of the drawings, wherein.

Figure 2:
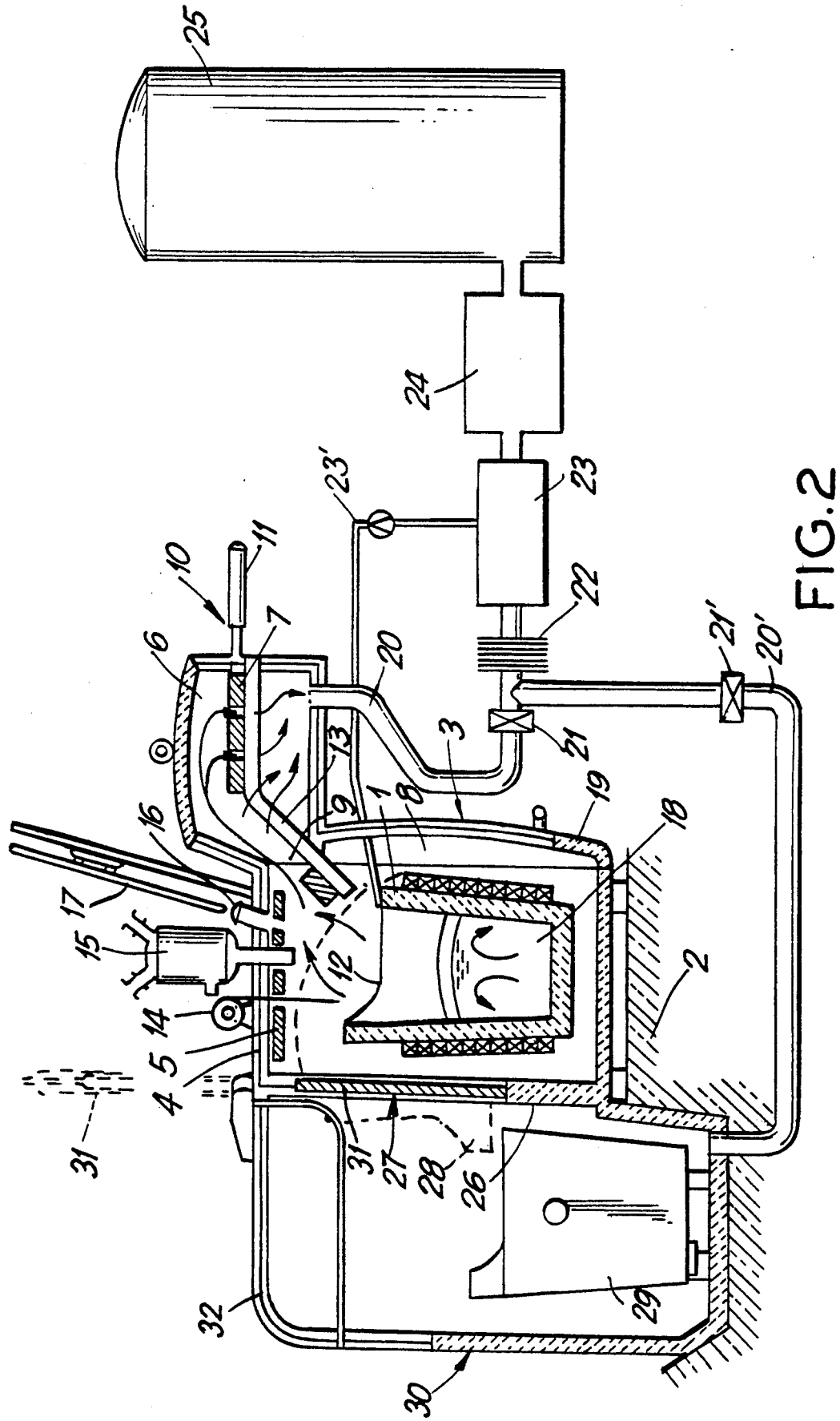

FIG. 1 is a schematic sectional illustration of a first embodiment of an arrangement for carrying out the method, FIG. 2 shows a further embodiment in an illustration analogous to that of FIG. 1.

An induction furnace designed as a crucible is denoted by 1 and is tiltably mounted relative to the base 2. This crucible induction furnace 1 serves for melting diverse types of metal scrap which contain admixtures of organic substances (plastics, synthetic material or other organic and inorganic components). The crucible induction furnace 1 is inserted into a gas-tight container 3 surrounding the crucible induction furnace 1. According to an embodiment not illustrated, the crucible induction furnace itself may be provided with a lid designed as a vacuum hood so as to close the crucible induction furnace is a gas-tight manner.

The ceiling 4 of the container 3 is equipped with a water-cooled heat shield 5. Lateral of the container 3, a charging chamber 6 is arranged at the level of the lid 4, for charging briquets 7 of metal scrap, e.g. briquets of automobile scrap, or loose scrap and organic substances, which charging chamber communicates with the interior 8 of the container 3 via an opening 9. The charging chamber 6 is equipped with a charging means 10 including sluices for introducing the metal scrap briquettes 7 and/or the organic substances as well as an externally actuatable means 11 for introducing the metal scrap briquets 7 and/or the organic substances into the crucible induction furnace 1 via a chute 13 directed towards the crucible opening 12.

On the ceiling 4 of the container 3 various means 14, 15 for supplying operating materials and alloying media are provided, passing through the ceiling 4 in a gas-tight manner. Furthermore, a closable opening 16 is provided on the ceiling 4 through which a lance 17 carrying a measuring and/or a sampling probe, e.g. for temperature measurement, is insertable into the melt 18 formed in the crucible induction furnace 1. Besides the heat shield 5, also the upper part of the container 3 is water-cooled.

To one side wall 19 of the crucible induction furnace 1 an off-gas line 20 is connected, which can be locked by a vacuum slider 21. In this line a separator 22 for separating solid and sublimable materials, a vacuum pump 24 as well as a further separator 23 for gaseous substances still present in the off-gases are installed. It finally enters into a process gas tank 25. A return means 23' to the melt is provided for a possible return of the liquefiable process materials. Such a return results in a further pyrolysis of the liquefiable process materials, and further process gas forms.

On the side wall 26 opposite that side wall 19 from which the off-gas line 20 departs, a tap opening 27 which may be closed in a gas-tight manner, is provided, through which the tapping spout 28 of the crucible induction furnace 1 passes in the tapping position of the latter to project over a ladle 29 placed in readiness.

According to the embodiment illustrated in FIG. 2, a further container 30 is installed adjacent the container 3 so as to avoid off-gases during tapping, the tap opening 27 being located in a partition wall 26 provided between the two containers 3, 30. A slider 31 is provided to close the tap opening 27, which slider is vertically upwardly movable into the position illustrated in broken lines. The ceiling 32 of the further container 30 can be removed or pivoted out for inserting or removing the ladle 29 receiving the melt 18.

In this embodiment, off-gas lines 20, 20' depart both from the charging chamber 6, via which also the first container 3 accommodating the crucible induction furnace can be evacuated, and from the second container 30 accommodating the ladle 29, and both off-gas ducts are provided with one vacuum slider 21, 21' each and unite in front of the dust separator 22. Hence, tapping also occurs under negative pressure.

In the following the functioning of the plant when producing metals, such as, e.g. steel, from scrap will be described:

When tapping the preceding melt, a molten steel residue of approximately ⅓ of the tapping weight is left in the crucible induction furnace 1. The crucible induction furnace 1 is tilted back into the melting position (furnace axis vertical), the tap opening 27 of the container 3 is closed, and the pressure is lowered to the negative pressure required via the vacuum pump 24.

When the latter has been reached, the crucible induction furnace 1 is supplied with the appropriate electrical melting energy, and the continuous charging of scrap 7 comprising organic components is initiated from the sluice 6 which has also been evacuated.

During melting, alloying substances and slag formers can be supplied to the furnace from the additive system 14 and 15.

The synthetic material portion of the scrap 7 is decomposed into solid, gaseous, sublimable and liquefiable pyrolysis products (e.g. soot, hydrocarbons, $H_2$, $Cl_2$ etc.) when immersed in the liquid melt, or when placed on a hot, solid residual melt, or already thereabove, by a pyrolysis reaction at metal melting temperatures of more than 700° C. (with steel, approximately 1600° C.).

Dusts and metal vapors forming are removed by a separator 22. The liquefiable components of the off-gases are frozen out in cooling traps of the separator 23. The remaining gases are collected in the process tank 25.

When all the scrap charged has been melted in the crucible induction furnace 1, the scrap is overheated in the crucible induction furnace to tapping temperature, the container 3 is brought to atmospheric pressure by flooding with nitrogen or with air, the tap opening 27 is opened, and the liquid steel is emptied into the ladle 29.

When operating the plant with wastes of organic substances one proceeds as follows:

A liquid steel melt is melted from iron scrap in the crucible induction furnace 1 under negative pressure.

When this melt has reached a temperature range of at least 1570° C., waste is continuously charged from the charging chamber 6 onto the molt surface via the supply means. At these temperatures the organic portion of the waste is converted to hydrogen, hydrocarbons, carbon and other gaseous products by pyrolysis. The pyrolysis products forming are treated in the separators 22 and 23 as with the scrap melt-down variant.

The steel melt is kept at an approximately constant temperature over many hours during the entire procedure. In doing so, the supply of electric energy is controlled such that no substantial temperature variations of the bath occur.

The composition of the melt 18 may be changed, if required, via the means 14. If required, the melt 18 may be covered with slag from the means 15.

The process time is only limited by the durability of the refractory lining of the crucible induction furnace 1. During down-times, the melt 18 in the crucible induction furnace may be kept at a constant temperature.

Organic liquids may be treated in the same manner as solid organic substances, by continuously supplying them onto the melt surface.

In the following the operation of the plant for processing inorganic dusts will be described:

In the crucible induction furnace 1, a melt of an iron alloy is melted from iron scrap and carbon under negative pressure, having a carbon content of from 2–5% and filling approximately ⅓ of the crucible volume.

When this melt has reached a temperature range of at least 1570° C., inorganic dust is continuously fed via the supply means from the charging chamber 6 onto the melt surface, possibly admixed with aluminum or ferrosilicon for suppressing an excessive boiling reaction with oxidic dusts. At this temperature, the oxidic dusts are reduced by carbon and by the other reduction media, and the metals either merge into the basic melt, or they are separated in the separator 22 after having been evaporated as metal vapor.

During the entire procedure the melt is kept at an approximately constant temperature and its tapped when so much melt has accumulated that possible boiling reactions would cause an overflow of the melt.

What we claim:

1. In a method of disposing of organic and inorganic substances by melting the inorganic substances and pyrolysing the organic substances, said method including collecting, purifying and separating the off-gases formed the improvement comprising:

charging said organic and inorganic substances into an induction furnace kept under negative pressure and containing a metal alloy selected from the group consisting of molten ferrous alloys, molten nonferrous alloys, solid ferrous alloys and solid non ferrous alloys, and melting said inorganic substances and gasifying and pyrolyzing said organic substances in said induction furnace close to the temperature of the molten metal alloy while substantially preventing gaseous $O_2$ from entering.

2. A method as set forth in claim 1, wherein the surface of said melt in said induction furnace is substantially free of slag.

3. A method as set forth in claim 1, further comprising covering said melt in said induction furnace with slag.

4. A method as set forth in claim 1, wherein for producing metal or metal pre-products from metal scrap contaminated with organic substances, said metal scrap is charged into said induction furnace under negative pressure and is melted in said induction furnace under negative pressure.

5. A method as set forth in claim 4, wherein less than three quarters of the melt forming in said induction furnace are tapped and at least one of scrap, organic substances and inorganic substances is charged into the liquid or solidified residual melt remaining in said induction furnace.

6. A method as set forth in claim 1, further comprising collecting and re-using the substances formed when purifying and separating the off-gases forming during the pyrolysis, freezing out liquefiable components thereof in cooling traps and re-using said components as raw materials, the remaining process gas consisting essentially of $H_2$, CO and $CH$, and being usable as a high-quality raw material for producing organic materials or as a heating or reaction gas.

7. A method as set forth in claim 6, wherein said liquefiable components are heavy hydrocarbons.

8. In a plant for disposing of organic and inorganic substances by melting the inorganic substances and pyrolyzing the organic substances, and of the type including a metallurgical vessel sealed relative to the external atmosphere and adapted to contain a molten or solid metal alloy, such as a steel melt or a non-ferrous metal melt or highly carburized iron, a charging means sealed relative to the external atmosphere and provided for charging said substances under negative pressure into said metallurgical vessel, and an off-gas suction means, the improvement wherein said metallurgical vessel is designed as an induction furnace adapted to gasify and pyrolyze the substances contained therein close to the temperature of the molten metal, a gas-tight first container is provided to enclose said induction furnace, a vacuum pump preceded by a gas purification means is connected to said first container to produce negative pressure so as to suck off the off-gases forming in melting scrap, and a closable tap opening is provided in said first container.

9. In a plant for disposing of organic and inorganic substances by melting the inorganic substances and pyrolyzing the organic substances, and of the type including a metallurgical vessel, said metallurgical vessel being sealed relative to the external atmosphere and adapted to contain a molten or solid metal alloy, such as a steel melt or a non-ferrous metal melt or highly carburized iron, charging means sealed relative to the external atmosphere and provided for charging said substances under negative pressure into said metallurgical vessel, and an off-gas suction means, the improvement wherein said metallurgical vessel is designed as an induction furnace adapted to gasify and pyrolyze the substances contained therein close to the temperature of the molten metal, a vacuum lid is placed on said induction furnace, said charging means being integrated in said vacuum lid and including a sluice system, and a vacuum pump preceded by a gas purification means is provided to produce negative pressure so as to suck off the off-gases forming in melting scrap.

10. A plant as set forth in claim 8, wherein said tap hole is provided in a wall of said first container, further comprising means for tilting said induction furnace within said first container and a pouring spout provided on said induction furnace and passing said tap hole with said induction furnace tilted.

11. A plant as set forth in claim 9, wherein said vacuum lid is gas-tight, further comprising means for displacing or pivoting said lid during tapping.

12. A plant as set forth in claim 8, further comprising a further container arranged beside said first container enclosing said induction furnace, a tapping ladle provided in said further container, a removable partition wall provided between said first container and said further container, said tap opening being provided in said removable partition wall, said further container also being connected to a vacuum pump.

13. A plant as set forth in claim 8, wherein said first container accommodating said induction furnace has a ceiling, further comprising a heat shield provided on said ceiling.

14. A plant as set forth in claim 8, wherein said induction furnace is designed as a crucible and said first container enclosing said crucible has a ceiling, further comprising feeding means provided on the ceiling of said crucible for introducing solid operating materials and alloying media into said crucible.

15. A plant as set forth in claim 9, wherein said induction furnace is designed as a crucible, further comprising feeding means provided on said vacuum lid of said crucible for introducing solid operating materials and alloying media into said crucible.

16. A plant as set forth in claim 8, wherein said first container enclosing said induction furnace has a ceiling provided with a closable opening for introducing and removing a sampling and/or measuring probe lance.

17. A plant as set forth in claim 9, wherein said vacuum lid of said induction furnace has a closable opening for introducing and removing a sampling and/or measuring probe lance.

18. A plant as set forth in claim 8, wherein said gas purification means comprises a solid matter separator and a further separator for gaseous liquefiable process materials arranged to follow said solid matter separator.

19. A plant as set forth in claim 9, wherein said gas purification means comprises a solid matter separator and a further separator for gaseous liquefiable process materials arranged to follow said solid matter separator.

20. A plant as set forth in claim 18, further comprising a return means for returning said liquefiable process materials to said melt.

21. A plant as set forth in claim 19, further comprising a return means for returning said liquefiable process materials to said melt.

22. A plant as set forth in claim 8, further comprising a gas tank arranged to follow said gas purification means for collecting and storing process gases.

23. A plant as set forth in claim 9, further comprising a gas tank arranged to follow said gas purification means for collecting and storing process gases.

* * * * *